United States Patent
Nakamura

(10) Patent No.: US 6,738,521 B2
(45) Date of Patent: May 18, 2004

(54) CODING DEVICE AND CODING METHOD

(75) Inventor: Akihisa Nakamura, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 607 days.

(21) Appl. No.: 09/814,690

(22) Filed: Mar. 15, 2001

(65) Prior Publication Data

US 2002/0131097 A1 Sep. 19, 2002

(51) Int. Cl.$^7$ ................................................ G06K 9/36
(52) U.S. Cl. ........................................................ 382/232
(58) Field of Search .................................. 382/232, 239; 358/426.01, 426.02, 426.03, 426.04, 426.06, 426.07, 426.11, 539

(56) References Cited

U.S. PATENT DOCUMENTS 5,345,317 A * 9/1994 Katsuno et al. ............... 382/239
5,701,367 A * 12/1997 Koshi et al. .................. 382/239
6,426,809 B1 * 7/2002 Hayashi et al. .............. 358/529

FOREIGN PATENT DOCUMENTS

| JP | 8-191395 | 7/1996 |
| JP | 11-55528 | 2/1999 |
| JP | 2000-59597 | 2/2000 |

* cited by examiner

Primary Examiner—Jose L Couso
(74) Attorney, Agent, or Firm—Foley & Lardner LLP

(57) ABSTRACT

A CPU reads out image data from a memory and sets the image data of a trial line number in a coding amount estimation device. The coding amount estimation device refers to a parameter table, generates coding parameters formed by combining parameters, and sets the coding parameters in a coder. The coding amount estimation device causes the coder to execute JBIG coding of the image data of the trial line number and estimates a coding amount. When there remains no untried parameter combination from the parameter table, the coding amount estimation device sets the coding parameters, which provide a minimum coding amount, in the coder as optimal coding parameters. After the optimal coding parameters have been set in the coder, the CPU reads out image data of all lines from the memory and causes the coder to execute JBIG coding.

14 Claims, 8 Drawing Sheets

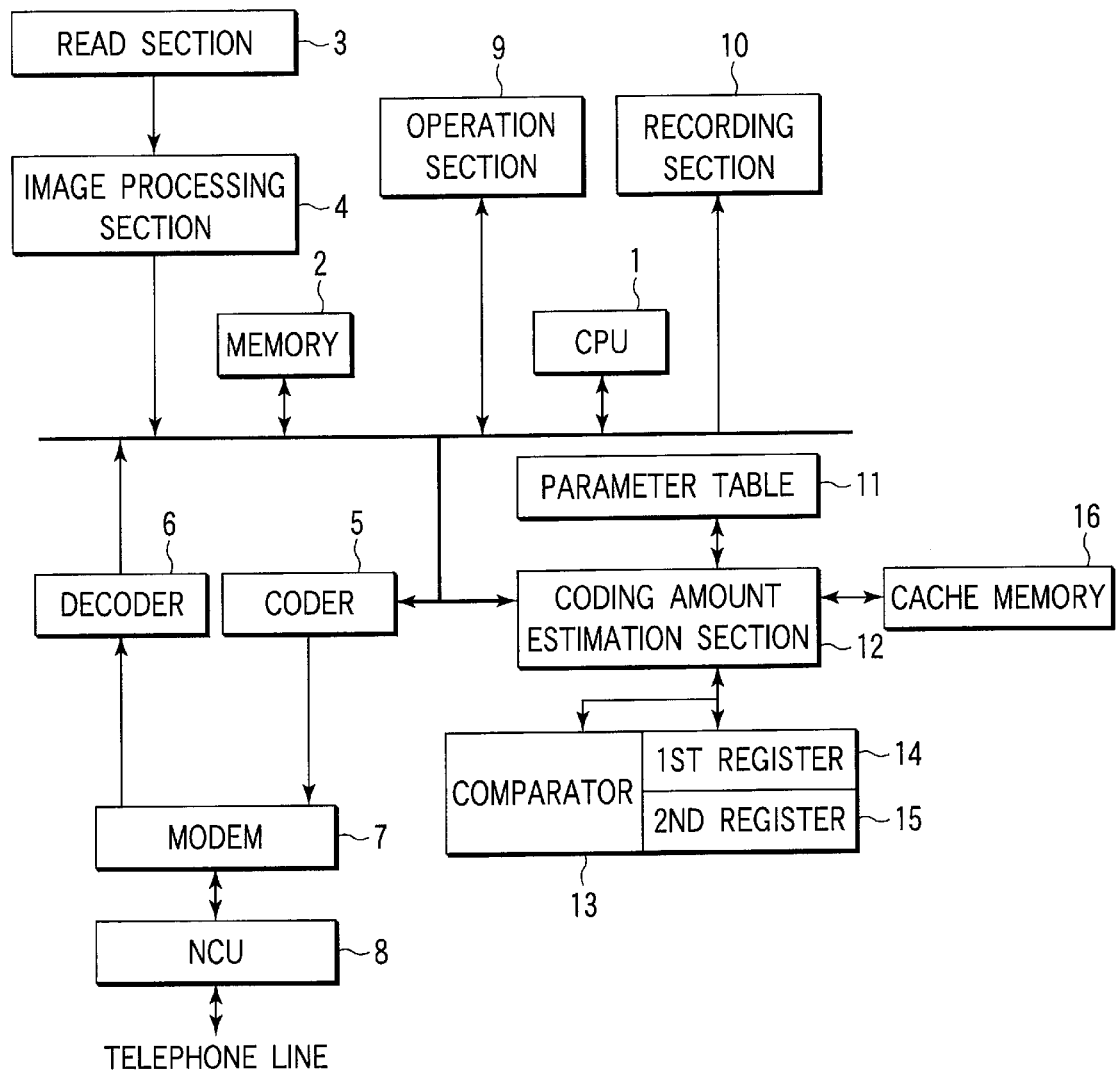
F I G. 3

CODING DEVICE AND CODING METHOD

BACKGROUND OF THE INVENTION

The present invention relates to a coding device and a coding method for performing coding by optimizing coding parameters in facsimile communication, etc.

In the prior art, when JBIG (Joint Bi-level Image Coding Experts Group) coding is performed in facsimile communication, etc., predetermined values set by specifications of devices or empirically acquired values are used as coding parameters set as coding conditions. The compression efficiency (coded data amount) of JBIG varies depending on combinations of the various coding parameters in accordance with characteristics of image data. However, since the conventional coding uses the predetermined parameter conditions, it fails to achieve optimal coding efficiency.

Although there is a prior-art technique wherein coding efficiency is optimized by varying an AT (Adaptive Template) pixel position, which is one of parameters, the effect of this technique is not adequate.

In general terms, in the conventional facsimile system, etc., when plural image data units are coded (or decoded) by one coding section with the same or different coding schemes, the image data units are assigned to plural task processes and are coded in a time-division manner. In this case, a firm for controlling the coding process successively carries out the plural task processes (coding processes) in units of a fixed (predetermined) time. However, in order to efficiently use the process unit time, it is necessary to start the coding after setting in the coding section an estimated number of lines which can be coded in the predetermined time.

In the prior art, however, it is not possible to exactly estimate the number of lines. Thus, only the number of lines, which is less than a maximum number and is processible without fail in the predetermined time, has to be set irrespective of the content of image data. Accordingly, there arise such problems that no coding is performed in some time period within the predetermined time and as a result the task process cannot efficiently be carried out in the predetermined unit time.

BRIEF SUMMARY OF THE INVENTION

An object of the present invention is to provide a coding device and a coding method for performing coding by optimizing a coding efficiency in accordance with image data.

Another object of the invention is to provide a coding device capable of efficiently performing task processes in units of a predetermined time in accordance with image data.

In order to achieve the objects, the present invention provides a coding device having a coder for coding image data, the coding device comprising: a first setting section for setting therein a predetermined amount of image data to be coded; a storage section for storing a plurality of parameters; a generating section for generating a combination of parameters using the parameters stored in the storage section; an estimation section for estimating a coding amount by setting the combination of parameters generated by the generating section in the coder and coding the predetermined amount of image data set by the first setting section; a second setting section for setting in the coder the combination of parameters, which provides a minimum coding amount, on the basis of an estimation result obtained by the estimation section; and a control section for coding all the image data to be coded, when the second setting section has set in the coder the combination of parameters, which provides the minimum coding amount.

The invention also provides a coding device having a coder for coding image data, the coding device comprising: a first setting section for setting therein a predetermined amount of image data to be coded; a storage section for storing, in an associated manner, a predetermined amount of image data having a predetermined number of kinds of characteristic images, and optimal parameter combination information for coding the predetermined amount of image data having the characteristic images; an estimation section for comparing the image data set in the first setting section with a characteristic image of each image data stored in the storage section, thereby determining the presence/absence of similar image data; a second setting section for reading out, when the estimation section has determined the presence of the similar image data that is similar in characteristic image, the parameter combination information corresponding to the similar image data from the storage section, and setting the parameter combination based on the parameter combination information in the coder; and a control section for executing a control to code all the image data to be coded, when the second setting section has set the parameter combination in the coder.

The present invention provides a coding device having a coder for coding image data, the coding device comprising: a first setting section for setting a unit time of a task process; a second setting section for setting a predetermined amount of image data to be coded; a storage section for storing a plurality of parameters; a generating section for generating a combination of parameters using the parameters stored in the storage section; an estimation section for estimating a coding size by setting the combination of parameters generated by the generating section in the coder and coding the predetermined amount of image data set by the second setting section; a first calculation section for calculating a compression ratio from a minimum coding size of the parameter combination estimated by the estimation section; a second calculation section for calculating, from the compression ratio calculated by the first calculation section, a processible amount of coding within the unit time of the task process set by the first setting section; and control means for executing a control to set a task process time for the image data to be coded, on the basis of the processible amount for coding within the unit time of the task process calculated by the second calculation section.

The invention provides a coding device having a coder for coding image data in a Huffman scheme, the coding device comprising: a first setting section for setting a unit time of a task process; a second setting section for setting a predetermined amount of image data to be coded; an estimation section for estimating a coding size by coding the predetermined amount of image data set by the second setting section; a first calculation section for calculating a compression ratio from the coding size estimated by the estimation section; a second calculation section for calculating, from the compression ratio calculated by the first calculation section, a processible amount of coding within the unit time of the task process set by the first setting section; and control means for executing a control to set a task process time for the image data to be coded, on the basis of the processible amount for coding within the unit time of the task process calculated by the second calculation section.

The present invention provides a coding method for a coding device having a coder for coding image data, the method comprising: setting a predetermined amount of image data to be coded; generating a combination of parameters using a plurality of stored parameters; estimating a coding amount by setting the generated combination of parameters in the coder and coding the predetermined amount of the set image data; setting in the coder the combination of parameters, which provides a minimum coding amount, on the basis of an estimation result; and coding all the image data to be coded.

This invention provides a coding method for a coding device having a coder for coding image data, the method comprising: setting a unit time of a task process; setting a predetermined amount of image data to be coded; generating a combination of parameters using a plurality of stored parameters; estimating a coding size by setting the generated combination of parameters in the coder and coding the predetermined amount of the set image data; calculating a compression ratio from an estimated minimum coding size of the parameter combination; calculating, from the calculated compression ratio, a processible amount of coding within the set unit time of the task process; and setting a task process time for the image data to be coded, on the basis of the calculated processible amount for coding within the unit time of the task process.

BRIEF DESCRIPTION OF THE SEVERAL VIEWS OF THE DRAWING

FIG. 3 is a block diagram schematically showing the structure of a facsimile apparatus according to a second embodiment of the present invention;

DETAILED DESCRIPTION OF THE INVENTION

Embodiments of the present invention will now be described with reference to the accompanying drawings.

To begin with, a first embodiment will be described.

Figure 1:
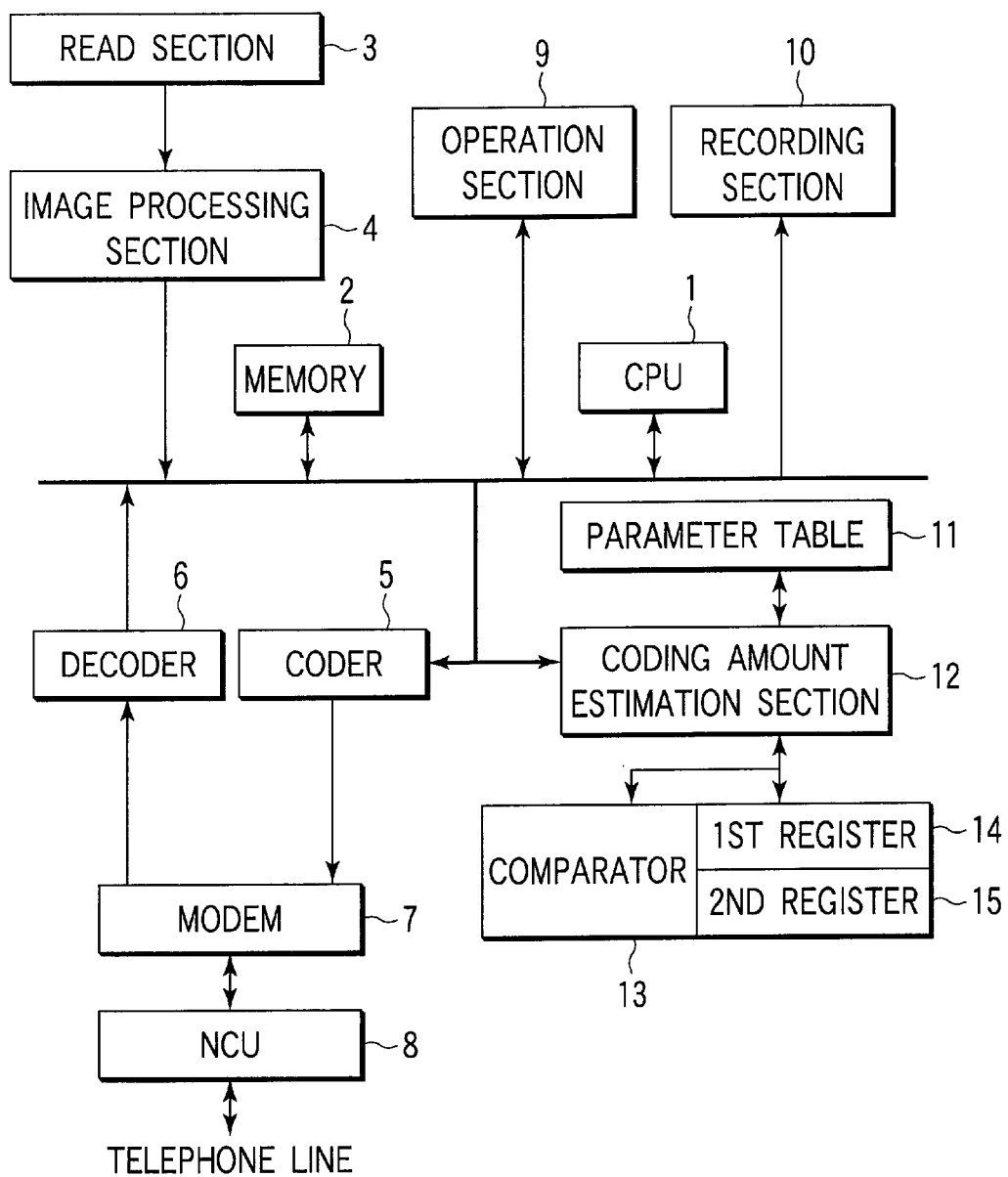
FIG. 1 is a block diagram schematically showing the structure of a facsimile apparatus according to a first embodiment of the present invention.

FIG. 1 shows a schematic structure of a facsimile apparatus according to a first embodiment of the invention which relates to a coding device and a coding method. The facsimile apparatus comprises a CPU 1 for controlling the entirety of the apparatus; a memory 2 for storing control programs, image data, etc.; a read section 3 for reading an original image; an image processing section 4 for processing image data delivered from the read section 3; a coder 5 for coding image data; a decoder 6 for decoding image data; a modem 7 for modulating and demodulating coded image data; an NCU (Network Control Unit) 8 for connection with a telephone line and for data transmission; an operation section 9 comprising a display and hard keys and functioning to operate the apparatus; and a recording section 10 for outputting image data on a recording sheet. A parameter table 11 and a coding amount estimation device 12 are connected to the coder 5. A comparator 13, a first register 14 and a second register 15 are connected to the coding amount estimation device 12.

The coder 5 performs coding in a JBIG scheme.

The parameter table 11 stores a plurality of parameters used in the JBIG scheme.

The coding amount estimation device 12 generates combinations of plural coding parameters in the JBIG scheme, performs trial image data coding with these coding parameters using the comparator 13, first register 14 and second register 15, and estimates a coding amount of the image data. The coding amount estimation device 12 will be described later in greater detail.

Figure 2:
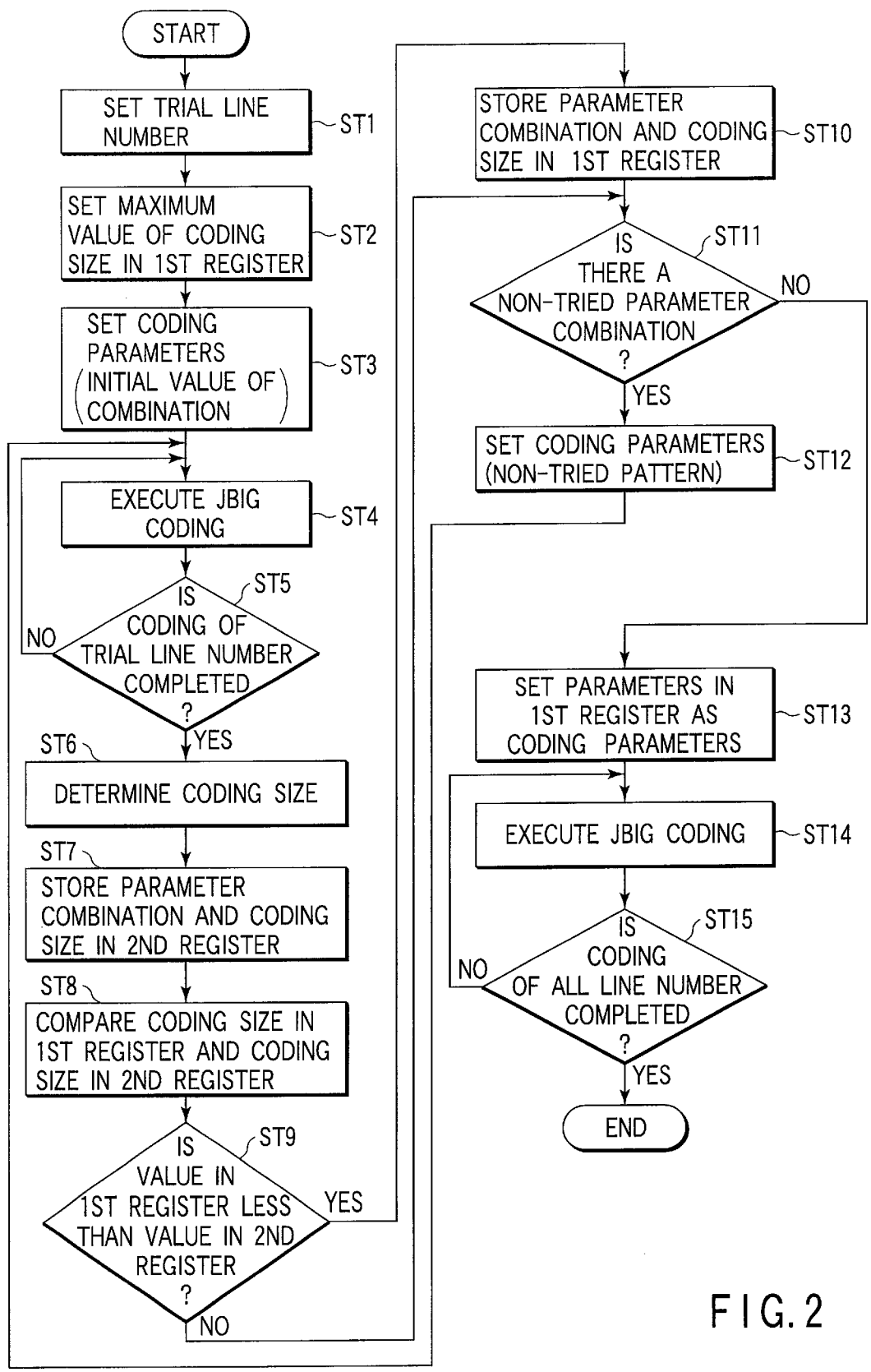
FIG. 2 is a flow chart illustrating an image data coding operation in the first embodiment.

An image data coding operation in the first embodiment with the above structure will now be described with reference to a flow chart of FIG. 2.

The CPU 1 reads out image data to be coded, from the memory 2 which stores image data read by the read section 3 and processed by the image processing section 4, and sets the read-out image data corresponding to a trial line number in the coding amount estimation device 12 (ST1).

The coding amount estimation device 12 sets a maximum value of a coding size in the first register 14 (ST2).

Subsequently, the coding amount estimation device 12 refers to the parameter table 11 and sets coding parameters (an initial value of a parameter combination) in the coder 5 (ST3).

Using the coder 5 in which the coding parameters have been set, the coding amount estimation device 12 executes JBIG coding of the image data of the trial line number set by the CPU 1 (ST4).

When the coding of the image data of the trial line number is completed (ST5), the coding amount estimation device 12 determines the coding size (value) (ST6) and stores the coding parameters (combination of parameters) and the coding size in the second register 15 (ST7).

The comparator 13 compares the coding size stored in the first register 14 and the coding size stored in the second register 15 (ST8).

If a comparison result in the comparator 13 shows that the coding size (value) in the second register 15 is less than the coding size (value) in the first register 14 (ST9), the coding amount estimation device 12 transfers the coding parameters (combination of parameters) and coding size stored in the second register 15 into the first register (ST10). Control then goes to step S11.

In step ST9, if the coding size in the second register 15 is greater than the coding size in the first register 14, control goes to step S11.

In step ST11, if there is a combination of non-tried parameters (non-tried pattern) from the parameter table 11, the coding amount estimation device 12 sets these coding parameters in the coder 5 (ST12) and carries out the operations from step ST4 to step ST9 or 10. In short, the coding amount estimation device 12 obtains a combination of parameters (coding parameters), which provides a minimum coding size (coding amount).

In step S11, where there is no combination of non-tried parameters from the parameter table 11, the coding amount estimation device 12 sets in the coder 5 the coding parameters stored in the first register 14 (ST13).

After the coding parameters have been set in the coder 5, the CPU 1 reads out image data corresponding to the number of all lines from the memory 2 and causes the coder 5 to execute JBIG coding (ST14).

If the CPU 1 has confirmed the completion of image data coding of the number of all lines (ST15), it finishes the coding process.

As has been described above, according to the first embodiment, coding of sampled image data is tried twice or more with combinations of coding parameters. Thereby, the coding efficiency is optimized.

A second embodiment of the invention will now be described.

FIG. 3 shows a schematic structure of a facsimile apparatus according to a second embodiment of the invention which relates to a coding device and a coding method. This facsimile apparatus differs from the facsimile apparatus of the first embodiment in that a cache memory 16 is connected to the coding amount estimation device 12. The parts common to those of the facsimile apparatus of the first embodiment are denoted by like reference numerals, and a description thereof is omitted.

The cache memory 16, as will be described later in detail, functions to store tried image data and optimal coding parameters (a parameter combination providing a minimum coding amount) set by the trial. In the second embodiment, it is determined whether there is an image data unit that coincides with any one of the image data units stored in the cache memory 16. If there is a coincident image data unit, the optimal coding parameters stored along with this image data are set in the coder 5.

Examples of the tried image data stored in the cache memory 16 are character image data, photograph image data, monochromatic half-tone image data, white-based image data, and black-based image data. The image data accompanied with the optimal coding parameters obtained by the trial are stored.

Figure 4:
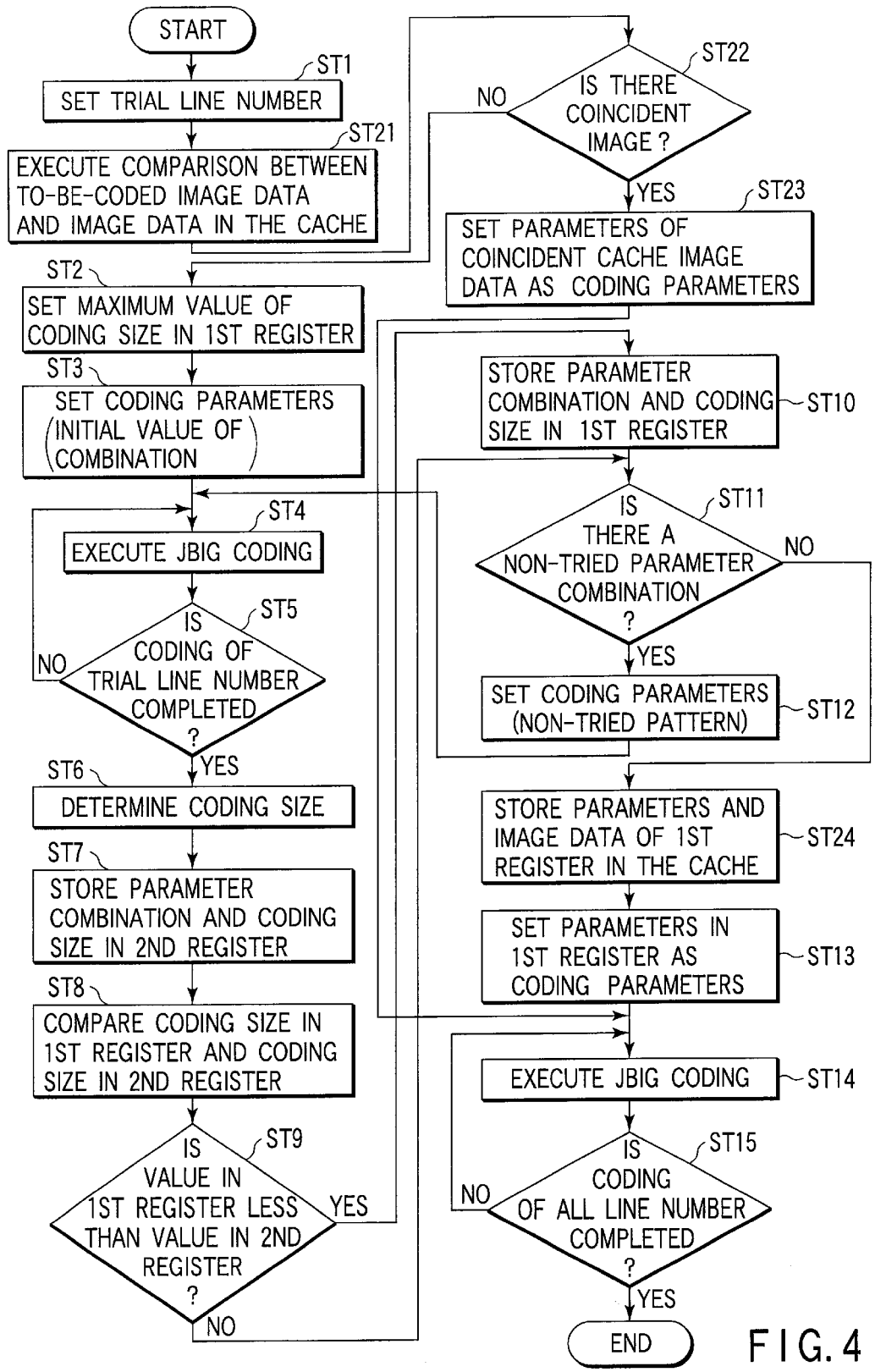
FIG. 4 is a flow chart illustrating an image data coding operation in the second embodiment.

An image data coding operation in the second embodiment with the above structure will now be described with reference to a flow chart of FIG. 4. The steps common to those in the first embodiment are denoted by like reference numerals, and a description thereof is omitted.

The CPU 1 reads out image data to be coded, from the memory 2 which stores image data read by the read section 3 and processed by the image processing section 4, and sets the read-out image data corresponding to a trial line number in the coding amount estimation device 12 (ST1).

The coding amount estimation device 12 executes comparison between the set image data to be coded and the plural image data units prestored in the cache memory 16 (ST21).

If a comparison result shows that there is a coincident image data unit (ST22), the coding amount estimation device 12 sets the coding parameters of the coincident image data stored in the cache memory 16 into the coder 5 (ST23).

Coincidence of image data in step ST22 is determined, for example, where the degree of similarity between the to-be-coded image data and each image data unit stored in the cache memory 16 exceeds a preset threshold of the degree of similarity. For example, when the to-be-coded image data consists of characters alone, coincident of image data is determined where the degree of similarly between the to-be-coded image data and the character image data stored in the cache memory 16 is high and exceeds a preset threshold of the degree of similarity. Thus, the coding parameters accompanying the image data are set in the coder 5.

On the other hand, if a comparison result shows that there is no coincident image data in the cache memory 16 (ST22), the CPU 1 executes the operations of steps ST2 to ST12 described in the first embodiment. In step ST11, if there is no untried parameter combination from the parameter table 11, the coding amount estimation device 12 transfers the coding parameters and the image data stored in the first register 14 into the cache memory 16 (ST24). Subsequently, the coding amount estimation device 12 sets the coding parameters stored in the first register 14 into the coder 5 (ST13).

After the coding parameters have been set in the coder 5, the CPU 1 reads out image data corresponding to the number of all lines from the memory 2 and causes the coder 5 to execute JBIG coding (ST14).

If the CPU 1 has confirmed the completion of image data coding of the number of all lines (ST15), it finishes the coding process.

As has been described above, according to the second embodiment, each time image data and an associated optimal parameter combination have been set, these are stored in the cache memory. The image data to be coded is compared with the image data stored in the cache memory. If there is coincident image data, the optimal coding parameters (parameter combination) associated with this image data are used and thus the time for setting coding parameters is shortened.

A third embodiment will now be described.

Figure 5:
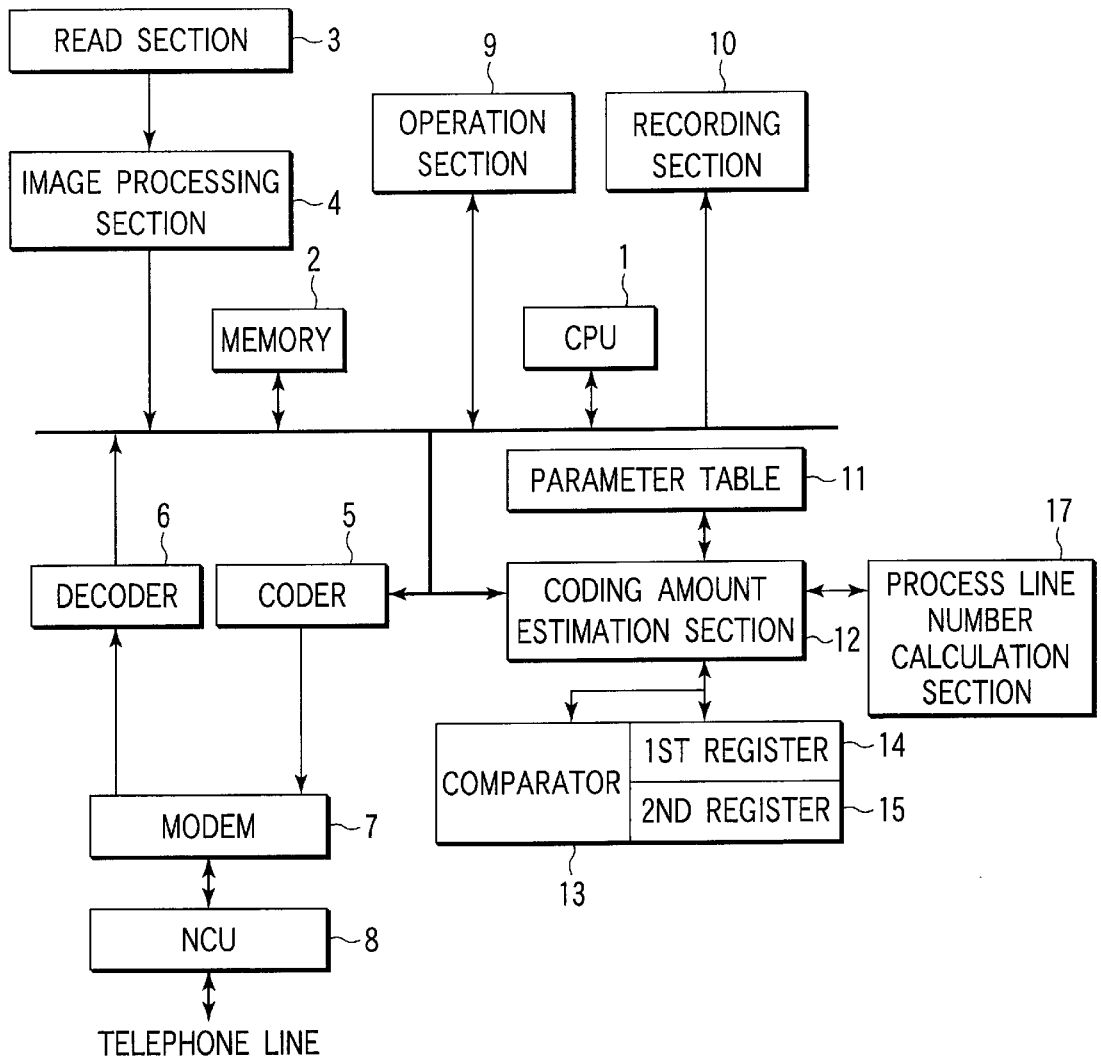
FIG. 5 is a block diagram schematically showing the structure of a facsimile apparatus according to a third embodiment of the present invention.

FIG. 5 shows a schematic structure of a facsimile apparatus according to a third embodiment of the invention which relates to a coding device and a coding method. This facsimile apparatus differs from the facsimile apparatus of the second embodiment in that the cache memory 16 is replaced with a process line number calculation section 17 connected to the coding amount estimation device 12. The parts common to those of the facsimile apparatus of the second embodiment are denoted by like reference numerals, and a description thereof is omitted.

The process line number calculation section 17, as will be described later in detail, calculates the number of lines to be processed in a unit time of a task process, on the basis of a compression ratio calculated from a coding size in the first register 14.

Figure 6:
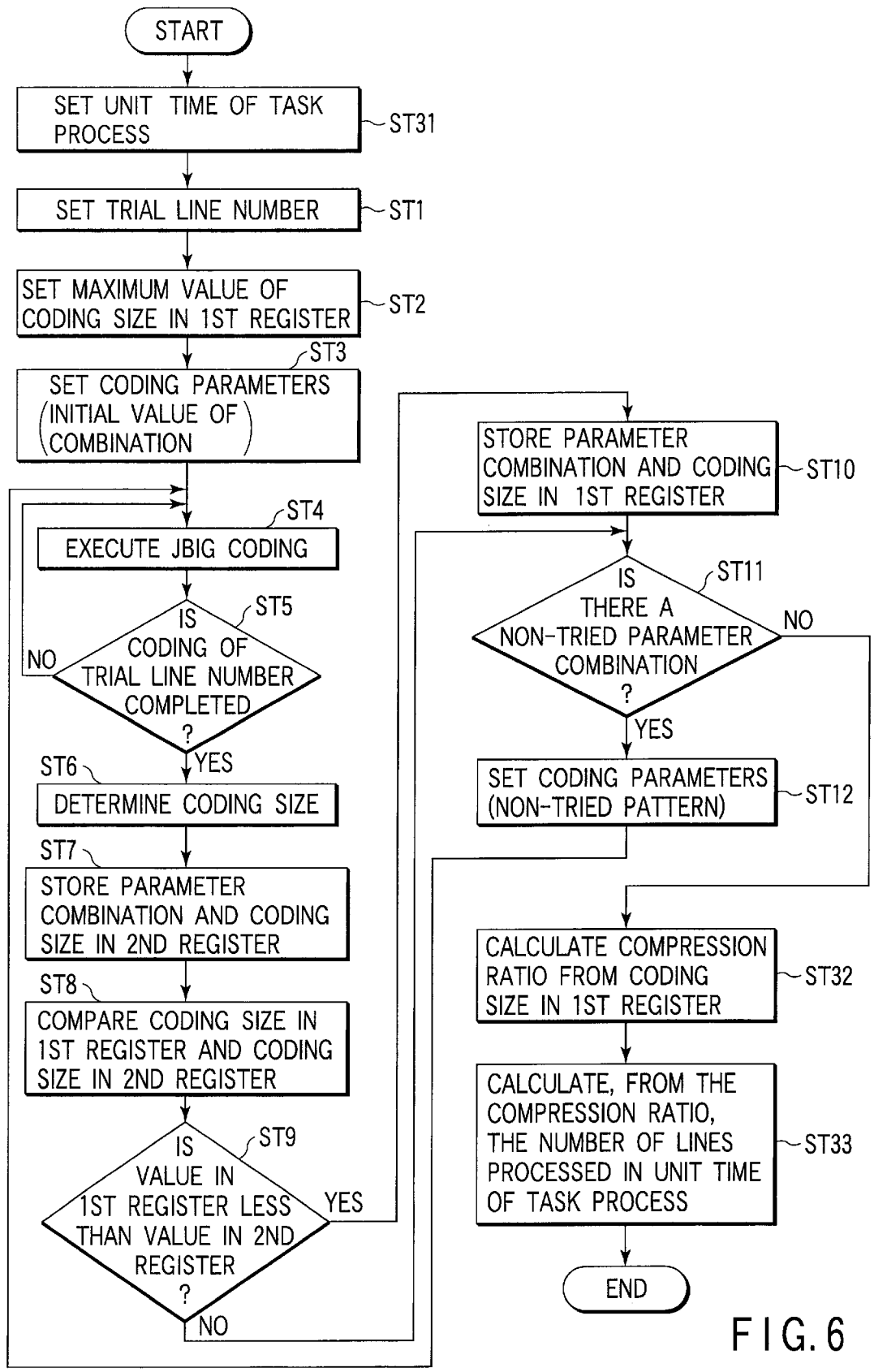
FIG. 6 is a flow chart illustrating an image data coding operation in the third embodiment.

An image data coding operation in the third embodiment with the above structure will now be described with reference to a flow chart of FIG. 6. The steps common to those in the second embodiment are denoted by like reference numerals, and a description thereof is omitted.

To start with, the CPU 1 sets a unit time of a task process in the process line number calculation section 17 via the coding amount estimation section 12 (ST31).

The CPU 1 then executes the operations of steps ST1 to ST12 described in the first embodiment. In step ST11, if there is no untried parameter combination from the parameter table 11, the coding amount estimation device 12 calculates a compression ratio from the coding size stored in the first register 14 (ST32).

The process line number calculation section 17 calculates, from the calculated compression ratio, the number of lines processed in the unit time of the task process set by the CPU 1 (ST33).

The CPU 1 finishes the calculation of the line number processed in the unit time, and efficiently sets the task process time of the image data on the basis of the calculated line number processed in the unit time.

As has been described above, according to the third embodiment, the number of lines, which can be processed within the unit time of the task process, is calculated, and the task process time corresponding to the image data can be efficiently set.

A fourth embodiment will now be described.

Figure 7:
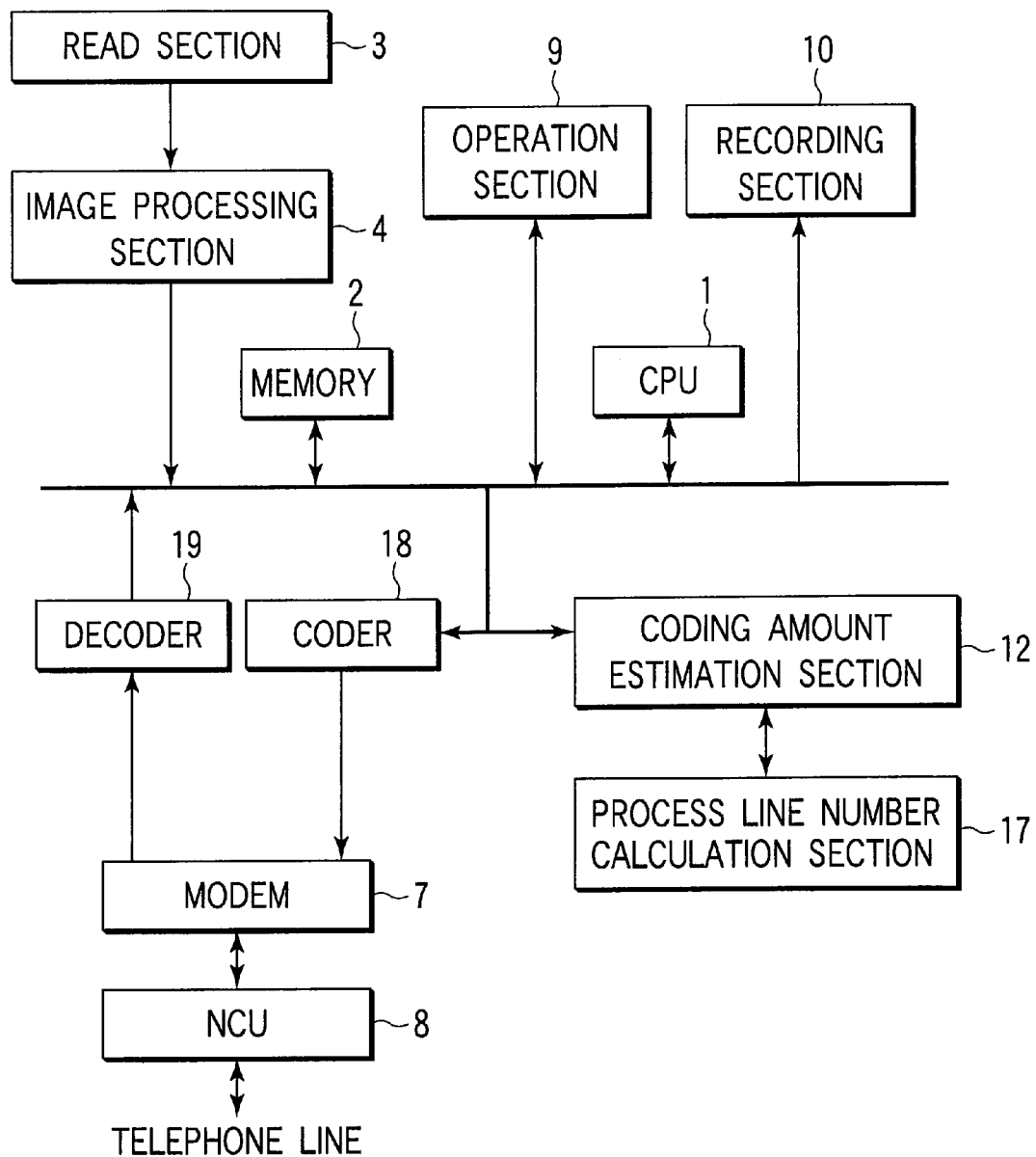
FIG. 7 is a block diagram schematically showing the structure of a facsimile apparatus according to a fourth embodiment of the present invention.

FIG. 7 shows a schematic structure of a facsimile apparatus according to a fourth embodiment of the invention which relates to a coding device and a coding method. This facsimile apparatus differs from the facsimile apparatus of the third embodiment in that the JBIG scheme of coding is replaced with Huffman scheme of coding.

In the facsimile apparatus of the fourth embodiment, the parameter table 11, comparator 13, first register 14 and second register 15 in the third embodiment are excluded, and a coder 18 and a decoder 19, which perform Huffman-scheme coding and decoding, are adopted. The parts common to those of the facsimile apparatus of the third embodiment are denoted by like reference numerals, and a description thereof is omitted.

Figure 8:
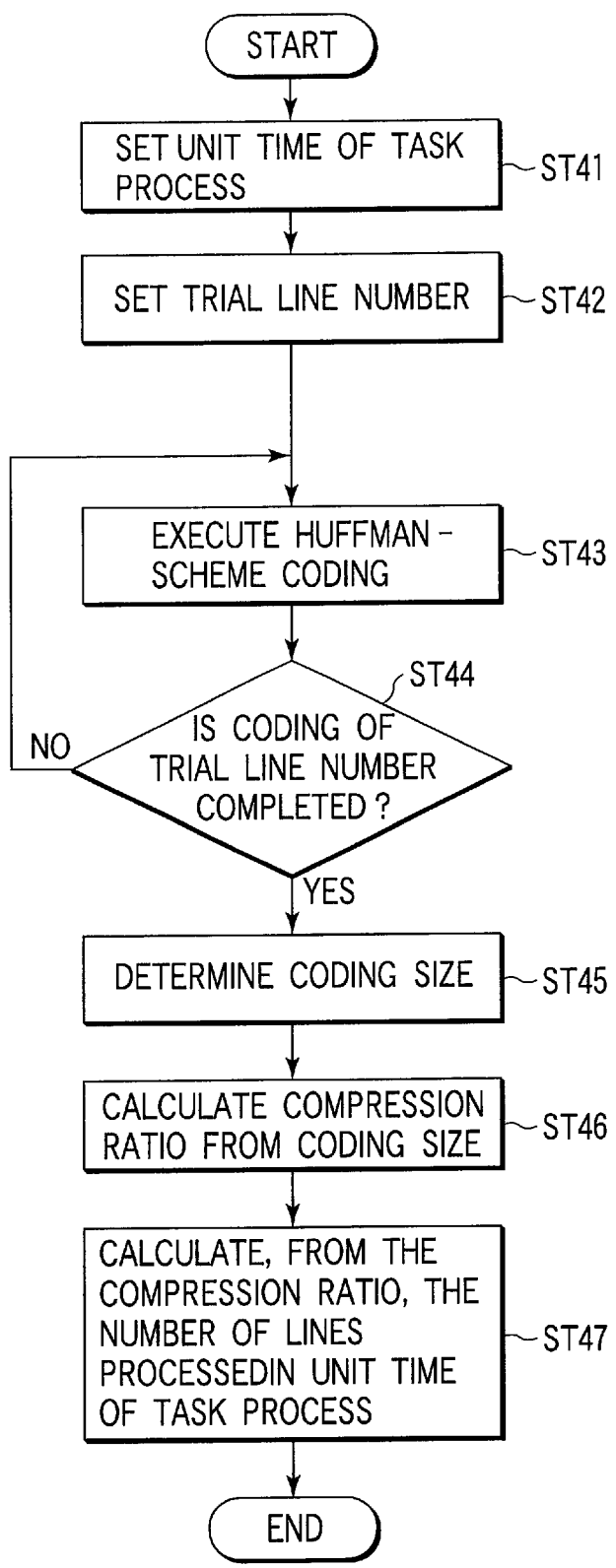
FIG. 8 is a flow chart illustrating an image data coding operation in the fourth embodiment.

An image data coding operation in the fourth embodiment with the above structure will now be described with reference to a flow chart of FIG. 8.

To start with, the CPU 1 sets a unit time of a task process in the process line number calculation section 17 connected to the coding amount estimation section 12 (ST41).

The CPU 1 then reads out image data from the memory 2 which stores image data read by the read section 3 and processed by the image processing section 4, and sets the read-out image data corresponding to a trial line number in the coding amount estimation device 12 (ST42).

The coding amount estimation device 12 enables the coder 18 to execute Huffman-scheme coding of the image data of the trial line number set by the CPU 1 (ST43).

When the coding of the image data of the trial line number is completed (ST44), the coding amount estimation device 12 determines the coding size (ST45) and calculates the compression ratio from the determined coding size (ST46).

The process line number calculation section 17 calculates, from the calculated compression ratio, the number of lines processed in the unit time of the task process set by the CPU 1 (ST47).

The CPU 1 finishes the calculation of the line number processed in the unit time, and efficiently sets the task process time of the image data on the basis of the calculated line number processed in the unit time.

As has been described above, according to the fourth embodiment, the number of lines, which can be processed within the unit time of the task process, is calculated, and the task process time corresponding to the image data can be efficiently set.

What is claimed is:

1. A coding device having a coder for coding image data, the coding device comprising:
    a first setting section for setting therein a predetermined amount of image data to be coded;
    a storage section for storing a plurality of parameters;
    a generating section for generating a combination of parameters using the parameters stored in the storage section;
    an estimation section for estimating a coding amount by setting the combination of parameters generated by the generating section in the coder and coding the predetermined amount of image data set by the first setting section;
    a second setting section for setting in the coder the combination of parameters, which provides a minimum coding amount, on the basis of an estimation result obtained by the estimation section; and
    a control section for coding all the image data to be coded, when the second setting section has set in the coder the combination of parameters, which provides the minimum coding amount.

2. A coding device according to claim 1, wherein said first setting section sets image data corresponding to a predetermined number of lines.

3. A coding device according to claim 1, wherein said storage section is a parameter table for storing a plurality of parameters used in a JBIG scheme coding.

4. A coding device according to claim 1, wherein said generating section generates all possible combinations of parameters using the plural parameters stored in the storage section.

5. A coding device according to claim 1, wherein said estimation section codes the predetermined amount of image data set by the first setting section, by a number of times corresponding to the number of combinations of parameters generated by the generating section.

6. A coding device according to claim 1, wherein said second setting section sets the combination of parameters, which provides a minimum coding amount of the predetermined amount of coded image data, in the coder as an optimal combination of parameters.

7. A coding device having a coder for coding image data, the coding device comprising:
    a first setting section for setting therein a predetermined amount of image data to be coded;
    a storage section for storing, in an associated manner, a predetermined amount of image data having a predetermined number of kinds of characteristic images, and optimal parameter combination information for coding the predetermined amount of image data having the characteristic images;
    an estimation section for comparing the image data set in the first setting section with a characteristic image of each image data stored in the storage section, thereby determining the presence/absence of similar image data;
    a second setting section for reading out, when the estimation section has determined the presence of the similar image data that is similar in characteristic image, the parameter combination information corresponding to the similar image data from the storage section, and setting the parameter combination based on the parameter combination information in the coder; and
    a control section for executing a control to code all the image data to be coded, when the second setting section has set the parameter combination in the coder.

8. A coding device according to claim 7, wherein the image characteristics stored in the storage section are those associated with character image data, photograph image data, monochromatic half-tone image data, white-based image data, and black-based image data.

9. A coding device according to claim 7, wherein said estimation section determines the presence of similar image data when the degree of similarity of image data exceeds a preset value.

10. A coding device having a coder for coding image data, the coding device comprising:
    a first setting section for setting a unit time of a task process;

a second setting section for setting a predetermined amount of image data to be coded;

a storage section for storing a plurality of parameters;

a generating section for generating a combination of parameters using the parameters stored in the storage section;

an estimation section for estimating a coding size by setting the combination of parameters generated by the generating section in the coder and coding the predetermined amount of image data set by the second setting section;

a first calculation section for calculating a compression ratio from a minimum coding size of the parameter combination estimated by the estimation section;

a second calculation section for calculating, from the compression ratio calculated by the first calculation section, a processible amount of coding within the unit time of the task process set by the first setting section; and control means for executing a control to set a task process time for the image data to be coded, on the basis of the processible amount for coding within the unit time of the task process calculated by the second calculation section.

11. A coding device according to claim 10, wherein the processible amount calculated by the second calculation section is the number of lines processible within the unit time of the task process for the image data to be coded.

12. A coding device having a coder for coding image data in a Huffman scheme, the coding device comprising:

a first setting section for setting a unit time of a task process;

a second setting section for setting a predetermined amount of image data to be coded;

an estimation section for estimating a coding size by coding the predetermined amount of image data set by the second setting section;

a first calculation section for calculating a compression ratio from the coding size estimated by the estimation section;

a second calculation section for calculating, from the compression ratio calculated by the first calculation section, a processible amount of coding within the unit time of the task process set by the first setting section; and control means for executing a control to set a task process time for the image data to be coded, on the basis of the processible amount for coding within the unit time of the task process calculated by the second calculation section.

13. A coding method for a coding device having a coder for coding image data, the method comprising: setting therein a predetermined amount of image data to be coded; generating a combination of parameters using a plurality of stored parameters; estimating a coding amount by setting the generated combination of parameters in the coder and coding the predetermined amount of the set image data; setting in the coder the combination of parameters, which provides a minimum coding amount, on the basis of an estimation result; and coding all the image data to be coded.

14. A coding method for a coding device having a coder for coding image data, the method comprising: setting a unit time of a task process; setting a predetermined amount of image data to be coded; generating a combination of parameters using a plurality of stored parameters; estimating a coding size by setting the generated combination of parameters in the coder and coding the predetermined amount of the set image data; calculating a compression ratio from an estimated minimum coding size of the parameter combination; calculating, from the calculated compression ratio, a processible amount of coding within the set unit time of the task process; and setting a task process time for the image data to be coded, on the basis of the calculated processible amount for coding within the unit time of the task process.

* * * * *